United States Patent [19]

Lassiaz

[11] Patent Number: 4,560,053
[45] Date of Patent: Dec. 24, 1985

[54] CLUTCH RELEASE BEARING MOUNTING ASSEMBLY

[75] Inventor: Philippe Lassiaz, Boulogne, France

[73] Assignee: Valeo, Paris, France

[21] Appl. No.: 561,297

[22] Filed: Dec. 14, 1983

[30] Foreign Application Priority Data

Dec. 15, 1982 [FR] France .................................. 82 21054

[51] Int. Cl.[4] ......................... F16D 13/74; F16D 23/14
[52] U.S. Cl. ................................... 192/98; 192/110 B; 192/89 B
[58] Field of Search .................... 192/98, 110 B, 89 B, 192/70.13

[56] References Cited

U.S. PATENT DOCUMENTS

| 2,810,464 | 10/1957 | Geibel ..................... | 192/98 |
| 3,741,361 | 6/1973 | Brandenstein ........................ | 192/98 |
| 3,900,091 | 8/1975 | Maucher ........................ | 192/110 B |
| 3,998,507 | 12/1976 | Tune .................... | 192/98 |
| 4,030,059 | 8/1977 | de Gennes ..................... | 192/98 |
| 4,228,882 | 10/1980 | Huber et al. ..................... | 192/110 B |
| 4,276,974 | 7/1981 | Ladin ............... | 192/110 B |
| 4,371,068 | 2/1983 | Billet ....................... | 192/98 |
| 4,374,556 | 2/1983 | Olschewski et al. ................. | 192/98 |
| 4,470,493 | 9/1984 | Renaud ................................ | 192/98 |
| 4,482,041 | 11/1984 | Ladin ..................... | 192/98 |

FOREIGN PATENT DOCUMENTS

| 2035502 | 6/1980 | United Kingdom ................... | 192/98 |
| 2058276 | 4/1981 | United Kingdom ................... | 192/98 |

Primary Examiner—Henry C. Yuen
Attorney, Agent, or Firm—Charles E. Brown; Charles A. Brown

[57] ABSTRACT

A clutch release bearing mounting assembly attaches a release bearing to the diaphragm spring of a pull-type clutch. An actuating component has a radial engagement flange which coacts with a disengaging member such as a diaphragm spring on the side of the diaphragm spring remote from the release bearing. A resilient coupling member axially connects the actuating member to the release bearing in the clutch release direction, that is, away from the clutch. Retaining fingers are arranged on the other side of the diaphragm spring, adjacent the release bearing, and cooperate with the engagement flange for axially maintaining the actuating component on the diaphragm spring. An annular biasing spring is also located on the other side of the diaphragm spring for urging the engagement flange against the diaphragm spring. The annular biasing spring is separate from the retaining fingers and bears against the clutch release bearing and against the diaphragm spring radially outwardly of the retaining fingers. This arrangement provides a two-way axial connection between the release bearing and the diaphragm spring.

20 Claims, 4 Drawing Figures

U.S. Patent  Dec. 24, 1985  4,560,053
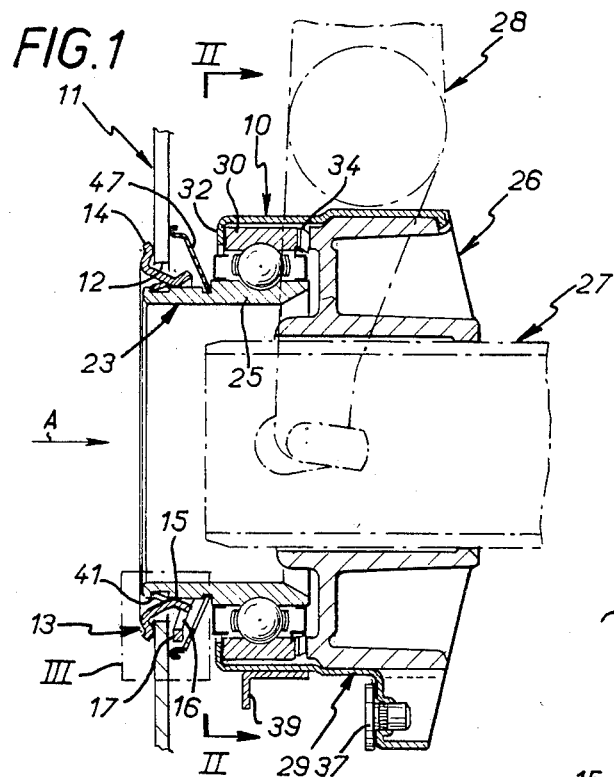
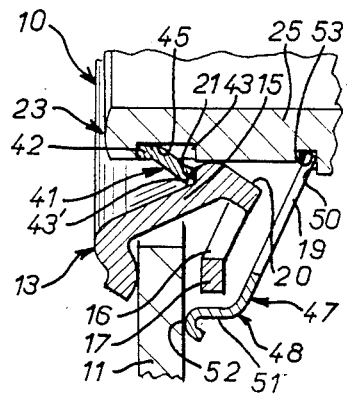
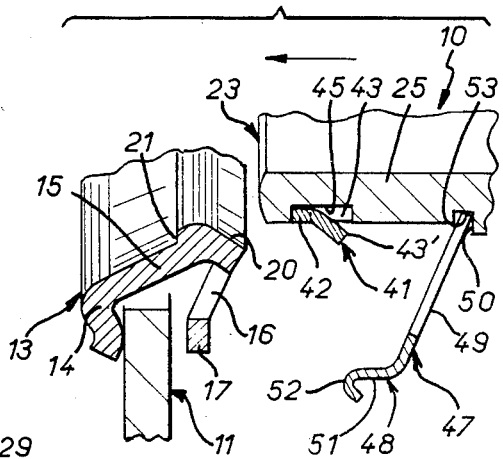
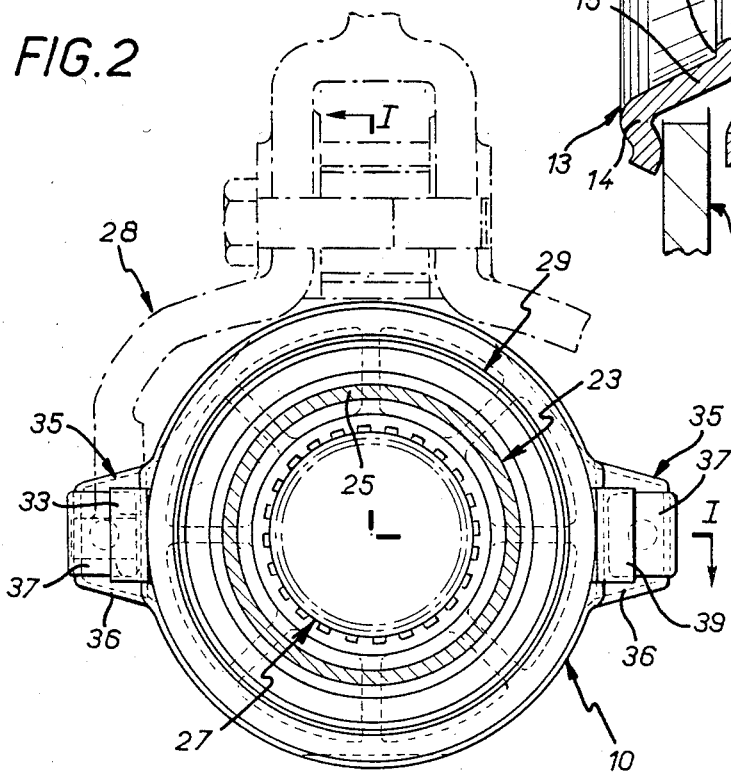

CLUTCH RELEASE BEARING MOUNTING ASSEMBLY

BACKGROUND OF THE INVENTION

The present invention relates generally to clutch release bearings, particularly for automotive clutches. The invention relates more particularly to clutch release bearings which are adapted to pull against the so-called pull-type disengaging means of the associated clutch and which are attached to the disengaging means.

The problem with this type of mounting is that the clutch release bearing operates on one side of the disengaging means (typically a diaphragm spring) generally axially remote from the clutch release bearing.

To overcome this problem it has already been proposed in some clutch release bearing mounting assemblies to provide between the clutch release bearing and the disengaging means a so-called actuating component which has on the one side of the clutch disengaging means generally axially remote from the clutch release bearing a radial flange for coacting with the disengaging means, so-called traction securement means or axial connecting means being disposed axially between the clutch release bearing and the actuating component for axially connecting the actuating component to the clutch release bearing in the clutch release direction, that is the axial direction from the disengaging means to the clutch release bearing, and retaining means disposed on the other side of the disengaging means, and cooperating with the engagement flange, for axially maintaining the actuating component on the disengaging means.

Such is, for example, the clutch release bearing mounting arrangement disclosed in French Pat. No. 75 08514 (publication No. 2,304,826). In this patent the axial connecting means employed between the disengaging means and the actuating component carried by the disengaging means advantageously comprise a radially resiliently deformable coupling member permitting snap fitting engagement of the clutch release bearing with the actuating component. To avoid any delayed action or lost motion of the actuating component on the disengaging means, so-called resilient biasing means constantly urge the actuating component toward the engagement flange. In practice to the present time the resilient biasing means bear against the actuating component and define by themselves the associated retaining means.

Such an arrangement has and continues to give satisfaction, namely when the clutch release bearing is constantly preloaded or under a residual load, urging it axially away from the disengaging means (that is, in the release direction) between successive clutch disengagements of the clutch.

Yet if there is no residual load against the clutch release bearing, the arrangement may be defective. Between consecutive clutch disengagements it is unsure whether there is positive bearing action between the clutch release bearing and the actuating component by means of the axial connecting means. There is therefore a risk, during clutch disengagement, of a delay in the action of the clutch release bearing, and owing to jerking of the axial connecting means, the possibility of damaging the axial connecting means shortening their service life, or even of breaking the axial connecting means.

OBJECT AND SUMMARY OF THE INVENTION

An object of the present invention is to provide a clutch release bearing mounting assembly which overcomes the above drawbacks and has additional advantages.

According to the invention there is provided a clutch release bearing mounting assembly for attaching a clutch release bearing to a pull-type clutch disengaging means. The mounting assembly includes an actuating component which has a generally radial engagement flange for coacting with the clutch disengaging means on one side of the clutch disengaging means generally axially remote from the clutch release bearing. Axial connecting means axially connect the actuating component to the clutch release bearing in a clutch release direction. Retaining means are arranged on the other side of the clutch disengaging means and cooperate with the engagement flange for axially maintaining the actuating component on the clutch disengaging means. Resilient biasing means are disposed on the other side of the clutch disengagement means for constantly urging the engagement flange of the actuating component against the clutch disengagement means. According to the improvement of the present invention the resilient biasing means are separate from the retaining means and bear against the clutch release bearing.

Thus, positive axial bearing action is insured, with all due certainty, constantly between the axial connecting means and the clutch release bearing so that upon clutch disengagement command, the clutch release bearing intervenes without any delay, lost motion, or jerking. The service life of the axial connecting means is thus improved. Further, the number of parts used is minimized. In addition to the cost savings the inertia of the assembly is also advantageously minimized.

To be sure, in U.S. Ser. No. 377,069 filed May 11, 1982 (assigned to the assignee of the present application) there is disclosed a clutch release bearing in which the resilient biasing or maintaining means associated with the disengaging means bears against the clutch release bearing. But in this patent application the resilient biasing means together with the radial engagement flange of the actuating component (which in practice is a simple radial engagement flange) define the retaining means associated with the actuating component, unlike the arrangement of the present invention.

BRIEF DESCRIPTION OF THE DRAWINGS

These and other features and advantages of the invention will be become apparent from the description which follows, given by way of example, with reference to the accompanying diagrammatic drawings.

FIG. 1 is a longitudinal sectional view of the clutch release bearing mounting assembly embodying the invention, taken along broken line I—I in FIG. 2;

FIG. 2 is a cross-sectional view of the clutch release bearing mounting assembly, taken along line II—II in FIG. 1;

FIG. 3 repeats, on a larger scale, details of FIG. 1 enclosed within phantom line box III in FIG. 1;

FIG. 4 is a view similar to that of FIG. 3 illustrating the engagement of the clutch release bearing with the actuating component carried by the disengaging means during the mounting of the release bearing on the disengaging means.

DESCRIPTION OF THE PREFERRED EMBODIMENT

In the illustrated embodiment the clutch disengaging means 11 is, as conventional, a diaphragm spring which is a dish spring and part of the associated clutch, and comprises a circularly continuous Belleville washer peripheral portion biasing the clutch into the engaged position, and a central portion having radial fingers effectively cooperable with a clutch release bearing 10.

As is known per se, the clutch release bearing 10 is attached to such a disengaging means 11 for applying to the latter a traction force in the release direction indicated by arrow A in FIG. 1 through the central opening radially inwardly of the diaphragm fingers. Such an arrangement is of the type disclosed in U.S. Ser. No. 535,071 (assigned to the assignee of the present application). As the actuating component 13 itself is not a part of the present invention it need not be described in particular detail.

It suffices to point out that the actuating component 13 comprises on one side of the disengaging means generally axially remote from the clutch release bearing 10, a radial engagement flange 14 and a sleeve 15 in one piece with the engagement flange 14. The sleeve 15 extends axially through the disengaging means 11 via the central opening 12 thereof. On the other side of the clutch disengaging means 11 the other end of the actuating component has spaced apart radially projecting lugs 16 having cantilevered retaining fingers 17 extending circumferentially in alignment with the engagement flange 14 and substantially parallel thereto. The retaining fingers 17, in cooperation with the engagement flange 14, axially maintain the clutch release bearing on the clutch disengaging means 11.

As disclosed in U.S. Ser. No. 535,071 the positioning of the actuating component 13 on the clutch disengagement means 11 may be very simply carried out by temporarily bending or flexing the ends of as many radial fingers of the clutch disengaging means 11 as there are retaining fingers 17 on the actuating component 13, and then rotating the actuating component 13 about the axis of the assembly in order to bring the retaining fingers 17 into alignment with the radial fingers of the clutch disengaging means 11, which fingers are contiguous with the previously flexed fingers, before the release thereof.

In the illustrated embodiment, the sleeve 15 of the actuating component 13 has, in axial section, a venturi configuration and therefore has on the other side of the clutch disengaging means adjacent the release bearing, a frustoconical engagement surface 20 oblique to the axis of the assembly tapering toward the axis as it extends away from the clutch release bearing 10.

In addition, in this embodiment the sleeve 15 of the actuating component 13 comprises for reasons which will be understood below an annular shoulder 21 facing toward the clutch release bearing 10.

The actual construction of the clutch release bearing 10 is not part of the present invention and therefore will not be described in detail herein.

In a generally conventional manner, the clutch release bearing 10 includes a drive member 23 which is adapted to coact with the disengaging means 11 and in practice is defined by an inner ball bearing race 25 which is of sufficient axial length for this purpose. The clutch release bearing 10 further comprises an operating member 26 by which, in the illustrated embodiment, the release bearing is axially slidably mounted on a guide member 27 and by which the clutch release bearing is adapted to be controlled by a control member 28 which comprises, for example, as schematically illustrated in phantom lines in FIGS. 1 and 2, a clutch throwout fork. Attachment means axially secure the drive member 23 to the operating member 26.

In the illustrated embodiment, and according to the arrangements of the type disclosed in U.S. Ser. No. 534,628 filed Sept. 22, 1983 (assigned to the assignee of the present application), the attachment means comprise a sleeve 29, axially fixed to the operating member 26 and surrounding the same, extends radially outwardly beyond the outer race 30 of the ball bearing of the drive member 23 and comprises a radially inwardly directed flange 32 at the end thereof.

Since in practice the clutch release bearing is of the permanently self-centered variety, annular clearance is provided between sleeve 29 and the ball bearing defining the drive member 29 as well as axially acting resilient means, for example a crinkle or undulated washer such as sold under the trademark "Onduflex".

According to the arrangements described in the above-mentioned U.S. Ser. No. 534,628 filed Sept. 22, 1983 the sleeve 29 has at the location of diametrally opposite, radially outwardly projecting stamped portions 35, two ears 36 for cooperation with the tines of the throwout fork comprised by the control member 28. A protective component 37 is mounted, as shown, on each of the ears 36 for contact with the control member 28. In practice, as shown, the sleeve 29 also has facing and parallel to each of the ears 36 a lug 39 secured by welding.

As is known per se, between the clutch release bearing 10 and the actuating component 13 are disposed axial connecting means or traction securement means for axially connecting the actuating component 13 to the clutch release bearing 10 in the release direction A which runs axially from the disengaging means 11 toward the clutch release bearing 10.

In the illustrated embodiment, and in accordance with arrangement disclosed in the aforementioned French Pat. No. 75 08514, the axial connecting means comprises a radially resiliently deformable coupling member 41. In practice the coupling member 41 comprises an annular part including a slotted circular portion 42 and a portion divided into a plurality of axial tongues 43, and radial fingers 43', the axial tongues 43 being in axial alignment and contiguous with circular portion 42, while the radial fingers 43' which alternate, as shown, with the axial tongues 43 are radially offset.

The edges of the slotted circular portion 42 and the axial tongues 43 of the coupling member 41 bear against the radial walls of a groove 45 provided at the corresponding axial end of the inner race 25 of the ball bearing defining the drive member 23 of the clutch release bearing 10. By means of the edges of the radial fingers 43' the coupling member 41 bears against the annular shoulder 21 on the actuating component 13 and more particularly on the sleeve 15 thereof.

Finally, as known per se, resilient biasing means 47 associated with the disengaging means 11 are disposed on the other side of the disengaging means axially adjacent the release bearing and constantly urge the engagement flange 14 of the actuating component 13 into contact with the disengaging means.

According to the invention the resilient biasing means 47 are different from the retaining means, that is the retaining fingers 17 associated with the actuating component 13, and the resilient biasing means 47 bear against the clutch release bearing 10.

In practice, in the illustrated embodiment, the resilient biasing means 47 comprise an annular member having a circularly continuously peripheral portion 48 by which the biasing means 47 bears against the disengaging means 11 radially beyond the retaining fingers 17 with respect to the axis of the assembly, and a central portion divided into radial fingers 49 which bear against a transverse or radial shoulder provided for this purpose on the clutch release bearing 10.

In the illustrated embodiment the peripheral portion 48 of the resilient biasing means 47 has beyond an axial section 51 which extends around retaining fingers 17, a bead 52 of rounded cross section for bearing against the disengaging means 11.

Further, according to another feature, the ends of the radial fingers 49 are engaged in an annular groove 53 formed in the clutch release bearing, and more particularly in the outer surface of the inner race 25 of the ball bearing which defines the drive member 23, and one of the annular walls of the groove 53 defines the corresponding transverse or radial shoulder of the clutch release bearing 10.

Thus it will be readily understood, and according to arrangements described in the above-mentioned French Pat. No. 75 08514, the attachment of the clutch release bearing 10 to the clutch disengaging means 11 which is previously equipped with the actuating component 13 is effected by simple snap fitting or detenting action.

In fact, as shown in FIG. 4, the inner race 25 of the clutch release bearing defining the drive member 23 of the same is equipped beforehand with the coupling member 41 and the resilient biasing means 47 and it suffices to axially insert the end of the inner race 25 of the clutch release bearing 10 into the sleeve 15 of the actuating component 13. In the course of this operation, which is made easier by the frustoconical engagement surface 20 on the actuating component 13, the radial fingers 43 of the annular coupling member 41 resiliently flex or bend radially inwardly until their ends come into line with the annular shoulder 21 on the actuating component 12 and they spring back to their initial configuration.

In conjunction therewith the peripheral portion 48 of the resilient biasing means 47 comes to bear against the disengaging means 11 during the mounting operation and at the end of the mounting operation, the resilient biasing means 47 is preloaded.

The actuating component 13 is resiliently biased by the resilient biasing means 47 against the clutch disengaging means 11 through both the drive member 23 of the clutch release bearing 10 and the coupling member 21 while the clutch release bearing 10 is axially fixed to the actuating component 13 and therefore to the disengagement means by the coupling member 41 in the release direction A.

However, according to the invention, the resilient biasing means 47 also axially connects the clutch release bearing 10 to the clutch disengaging means 11 in the axial direction opposite direction A. Accordingly, even if the clutch release bearing 10 does not undergo a residual traction load in direction A between successive clutch disengagements, there is permanent contact, with all due certainty, between the ends of the radial fingers 43 of the coupling member 41 and the transverse shoulder 21 on the actuating component 13. In other words, according to the invention, there is, not merely a one-way but a two-way connection between the clutch release bearing 10 and the clutch disengaging means.

The present invention is, of course, not intended to be limited to the illustrated and described embodiment, but encompasses all variations and alternative within the scope of the appended claims, namely as regards the actuating component, and/or the axial connecting means axially connecting the actuating component to the clutch release bearing, and/or the resilient biasing means associated with the clutch disengaging means. In particular, variations such as illustrated and described in French Pat. No. 75 08514 may be adopted.

What is claimed is:

1. A pull-type clutch release bearing mounting assembly for attaching clutch release bearing to pull-type clutch disengaging means, said clutch release bearing mounting assembly comprising an actuating component having a generally radial engagement flange for coacting with the clutch disengaging means on one side of the clutch disengaging means generally axially remote from the clutch release bearing, axial connecting means for axially connecting said actuating component to the clutch release bearing in a clutch relase direction, said actuating component including retaining means arranged on the other side of the clutch disengaging means and cooperating with said engagement flange for axially maintaining said actuating component on the clutch disengaging means, resilient biasing means disposed on the same side of the clutch disengagement means as said retaining means for constantly urging said engagement flange of said actuating component against the clutch disengaging means, said resilient biasing means being separate from said retaining means and bearing against the clutch release bearing.

2. The mounting assembly of claim 1, wherein said resilient biasing means bears against the clutch disengaging means radially outwardly of said retaining means.

3. The mounting assembly of claim 1, said actuating component and said retaining means in association with said resilient biasing means defining a two-way axial connection between the clutch release bearing and the clutch disengaging means.

4. The mounting assembly of claim 3, wherein said resilient biasing means bears against the clutch disengaging means radially outwardly of said retaining means.

5. The mounting assembly of claim 3, wherein said resilient biasing means comprises an annular part having a circularly continuous peripheral portion bearing against the clutch disengaging means, and a central portion divided into radial fingers bearing against a transverse shoulder formed on the clutch release bearing.

6. The mounting assembly of claim 4, wherein said resilient biasing means comprises an annular part having a circularly continuous peripheral portion bearing against the clutch disengaging means, and a central portion divided into radial fingers bearing against a transverse shoulder formed on the clutch release bearing.

7. The mounting assembly of claim 5, wherein said circularly continuous peripheral portion of said annular part comprises an axial section surrounding said retaining means.

8. The mounting assembly of claim 6, wherein said circularly continuous peripheral portion of said annular part comprises an axial section surrounding said retaining means.

9. The mounting assembly of claim 5, wherein said peripheral portion of said annular part comprises a bead of round cross-section for contact with the clutch disengaging means.

10. The mounting assembly of claim 5, wherein free ends of said radial fingers are received in a groove in the clutch release bearing.

11. The mounting assembly of claim 6, wherein free ends of said radial fingers are received in a groove in the clutch release bearing.

12. The mounting assembly of claim 7, wherein free ends of said radial fingers are received in a groove in the clutch release bearing.

13. A clutch release bearing mounting assembly for attaching clutch release bearing to pull-type clutch disengaging means, said clutch release bearing mounting assembly comprising an actuating component having a generally radial engagement flange for coacting with the clutch disengaging means on one side of the clutch disengaging means generally axially remote from the clutch release bearing, axial connecting means for axially connecting said actuating component to the clutch release bearing in a clutch release direction, retaining means arranged on the other side of the clutch disengaging means and cooperating with said engagement flange for axially maintaining said actuating component on the clutch disengaging means, resilient biasing means disposed on the other side of the clutch disengaging means for constantly urging said engagement flange of said actuating component against the clutch disengaging means, said resilient biasing-means being separate from said retaining means and bearing against the clutch release bearing, said resilient biasing means comprising an annular part having a circularly continuous peripheral portion bearing against the clutch disengaging means, and a central portion divided into radial fingers bearing against a transverse shoulder formed on the clutch release bearing.

14. A clutch release bearing mounting assembly for attaching clutch release bearing to pull-type clutch disengaging means, said clutch release bearing mounting assembly comprising an actuating component having a generally radial engagement flange coacting with the clutch disengaging means on one side of the clutch disengaging means generally axially remote from the clutch release bearing, axial connecting means for axially connecting said actuating component to the clutch release bearing in a clutch release direction, retaining means arranged on the other side of the clutch disengaging means and cooperating with said engagement flange for axially maintaining said actuating component on the clutch disengating means, resilient biasing means disposed on the side of the clutch disengaging means for constantly urging said engagement flange of said actuating component against the clutch disengaging means, said resilient biasing means being separate from said retaining means and bearing against the clutch release bearing, said resilient biasing means bearing against the clutch disengaging means radially outwardly of said retaining means, wherein said resilient biasing means compromise an annular part having a circularly continuous peripheral portion bearing against the clutch disengaging means, and a central portion divided into radial fingers bearing against a transverse shoulder formed on the clutch release bearing.

15. The mounting assembly of claim 13, wherein said circularly continuous peripheral portion of said annular part comprises an axial section surrounding said retaining means.

16. The mounting assembly of claim 14, wherein said circularly continuous peripheral portion of said annular part comprises an axial section surrounding said retaining means.

17. The mounting assembly of claim 13, wherein said peripheral portion of said annular part comprises a bead of round cross-section for contact with the clutch disengaging means.

18. The mounting assembly of claim 13, wherein free ends of said radial fingers are received in a groove in the clutch release bearing.

19. The mounting assembly of claim 14, wherein free ends of said radial fingers are received in a groove in the clutch release bearing.

20. The mounting assembly of claim 15, wherein free ends of said radial fingers are received in a groove in the clutch release bearing.

* * * * *